US009929798B2

United States Patent
Vonog et al.

(10) Patent No.: US 9,929,798 B2
(45) Date of Patent: Mar. 27, 2018

(54) COORDINATING DEVICES TO ESTIMATE DISTANCE, RELATIVE POSITION, AND DEVICE ATTITUDE

(71) Applicant: Wickr Inc., San Francisco, CA (US)

(72) Inventors: Stanislav Vonog, San Francisco, CA (US); Tara Lemmey, San Francisco, CA (US); Nikolay Surin, San Francisco, CA (US); Maxim Bykov, San Francisco, CA (US)

(73) Assignee: Wickr Inc., San Francisco, CA (US)

( * ) Notice: Subject to any disclaimer, the term of this patent is extended or adjusted under 35 U.S.C. 154(b) by 0 days.

(21) Appl. No.: 15/052,393

(22) Filed: Feb. 24, 2016

(65) Prior Publication Data

US 2016/0170008 A1    Jun. 16, 2016

Related U.S. Application Data

(63) Continuation of application No. 13/815,920, filed on Mar. 15, 2013, now abandoned.

(60) Provisional application No. 61/665,857, filed on Jun. 28, 2012.

(51) Int. Cl.
| | |
|---|---|
| *H04B 7/00* | (2006.01) |
| *H04B 7/26* | (2006.01) |
| *G01S 5/18* | (2006.01) |
| *G01S 5/02* | (2010.01) |

(52) U.S. Cl.
CPC ............. *H04B 7/26* (2013.01); *G01S 5/0247* (2013.01); *G01S 5/0289* (2013.01); *G01S 5/18* (2013.01); *G01S 5/186* (2013.01)

(58) Field of Classification Search
CPC ...... G01S 3/8083; G01S 5/186; G01S 15/025; G01S 5/0247; G01S 5/0289; G01S 5/18; H04B 7/26
See application file for complete search history.

(56) References Cited

U.S. PATENT DOCUMENTS

| | | | |
|---|---|---|---|
| 2002/0023010 A1* | 2/2002 | Rittmaster | .......... G06F 17/3087 705/26.1 |
| 2009/0067291 A1 | 3/2009 | Atsmon et al. | |
| 2009/0190441 A1 | 7/2009 | Zhao et al. | |
| 2010/0189271 A1* | 7/2010 | Tsujino | ..................... G01S 5/16 381/56 |
| 2011/0135102 A1* | 6/2011 | Huang | ...................... G06T 7/70 381/58 |
| 2011/0267924 A1 | 11/2011 | Horsky et al. | |
| 2012/0127831 A1 | 5/2012 | Gicklhorn et al. | |
| 2013/0102324 A1 | 4/2013 | Qiu et al. | |
| 2013/0315038 A1 | 11/2013 | Ferren et al. | |

(Continued)

OTHER PUBLICATIONS

Non-Final Office Action dated Aug. 17, 2016, in U.S. Appl. No. 15/140,319, filed Apr. 27, 2016.

(Continued)

*Primary Examiner* — Hovhannes Baghdasaryan
(74) *Attorney, Agent, or Firm* — Christian LaForgia

(57) ABSTRACT

The present invention contemplates a variety of improved techniques including methods and apparatus for coordinating a plurality of devices, and more specifically, a method and apparatus for coordinating a plurality of devices to estimate or calculate various distances, relative positions, device attitudes, and other absolute and/or relative kinematic data.

21 Claims, 15 Drawing Sheets

(56) References Cited

U.S. PATENT DOCUMENTS

2014/0004797 A1     1/2014   Vonog et al.
2016/0241329 A1     8/2016   Vonog

OTHER PUBLICATIONS

Scott, et al.; "Audio Location: Accurate Low-Cost Location Sensing"; Proceedings of the 3rd International Conference on Pervasive Computing; vol. 3468, pp. 1-18 (May 2005).
Non-Final Office Action dated Aug. 25, 2015, for U.S. Appl. No. 13/815,920 of Vonog, S., et al., filed Mar. 15, 2013.
Restriction Requirement dated Oct. 1, 2014, for U.S. Appl. No. 13/815,918, of Vong, S. et al. filed Mar. 15, 2013.
Non-Final Office Action, dated Apr. 17, 2015, in U.S. Appl. No. 13/815,918, filed Mar. 15, 2013.
Non-Final Office Action, dated Oct. 30, 2015, in U.S. Appl. No. 13/815,918, filed Mar. 15, 2013.

* cited by examiner

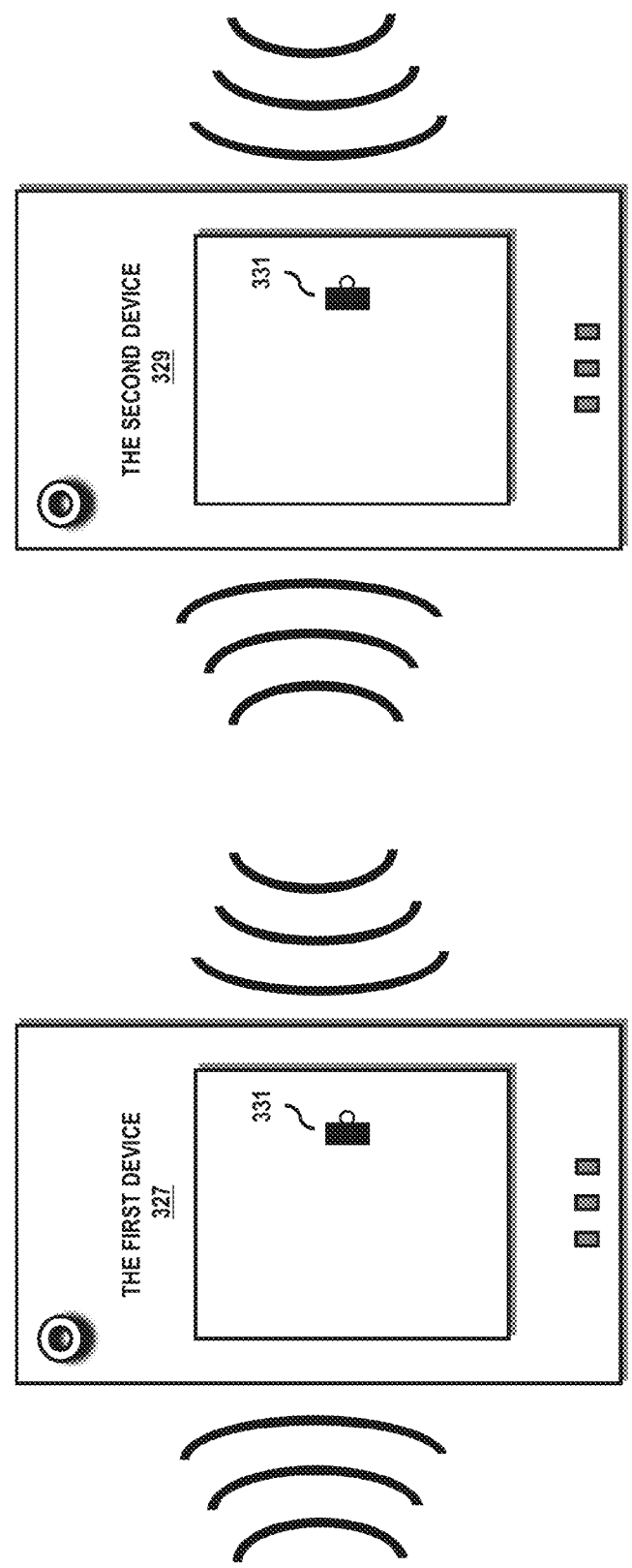

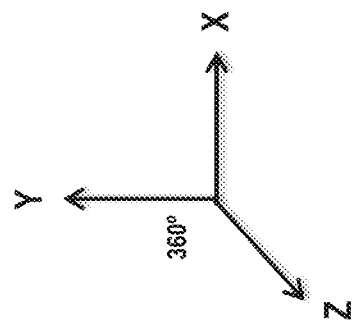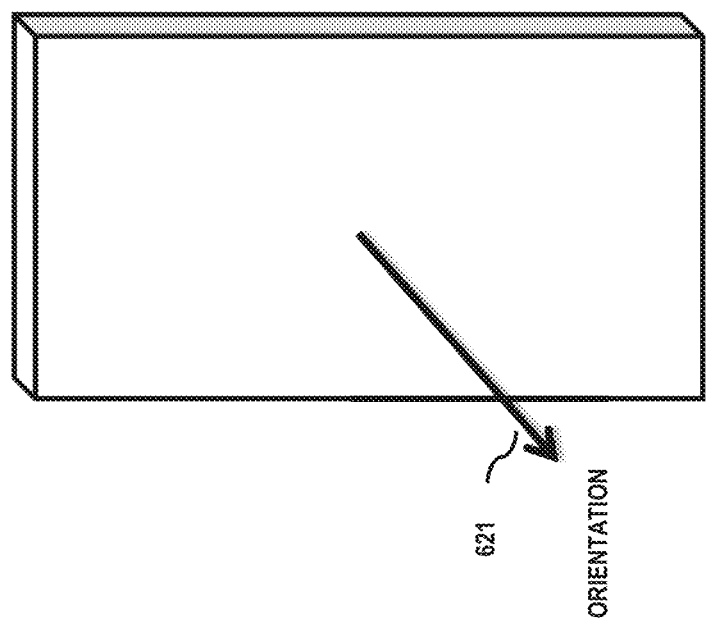
FIG. 6B

COORDINATING DEVICES TO ESTIMATE DISTANCE, RELATIVE POSITION, AND DEVICE ATTITUDE

CROSS-REFERENCE TO RELATED APPLICATIONS

This application is a Continuation of U.S. patent application Ser. No. 13/815,920, filed Mar. 15, 2013; which claims the benefit of U.S. Provisional Application No. 61/665,857, filed Jun. 28, 2012; the contents of the above identified applications are incorporated herein by reference in their entirety.

BACKGROUND OF INVENTION

Field of Invention

The present invention relates to methods and apparatus for coordinating a plurality of devices, and more specifically, a method and apparatus for coordinating a plurality of devices to estimate or find various distances, relative positions, device attitudes, and other absolute and/or relative kinematic data.

Summary of the Invention

This summary is provided to introduce in a simplified form certain concepts that are further described in the Detailed Description below. It is not intended to identify essential features of the claimed subject matter or to limit the scope of the claimed subject matter.

The present invention contemplates a variety of improved methods and apparatus for coordinating multiple devices to estimate or calculate various distances, relative positions, device attitudes, and other absolute and/or relative kinematic data. The present teaching provides a paradigm enabling various inventions such as:

(1) A means of estimating or calculating the distance between two devices;

(2) A means of estimating or calculating relative positions of devices;

(3) A means of estimating or calculating the attitude of a handheld device relative to other devices;

(4) A means of recognizing gestures performed with a handheld device; and (5) A technique of changing the user interface of a device based on the proximity of a second device.

Certain aspects of this invention contemplate two or more devices contain or connect to components capable of transmitting data between the devices (e.g., speakers and microphones, signal transmitters and receivers, etc.). Any suitable devices may be used in any combination, such as mobile phones, tablets, computers, and televisions (possibly connected via set-top boxes, game systems, DVD players, etc) and any suitable means may be used for transmitting data (e.g., via a Wifi, cellular, Ethernet network or other means of transmission).

Other aspects of the technique will be apparent from the accompanying figures and detailed description.

BRIEF DESCRIPTION OF DRAWINGS

One or more embodiments of the present invention are illustrated by way of example and not limitation in the figures of the accompanying drawings, in which like references indicate similar elements.

These and other objects, features and characteristics of the present invention will become more apparent to those skilled in the art from a study of the following detailed description in conjunction with the appended claims and drawings, all of which form a part of this specification. In the drawings:

FIG. 3C is a diagram of two devices sensing a surrounding environment according to one embodiment of this invention;

FIG. 6B illustrates the orientation and attitude of device according to one embodiment of this invention;

DETAILED DESCRIPTION OF THE INVENTION

Figure 1:
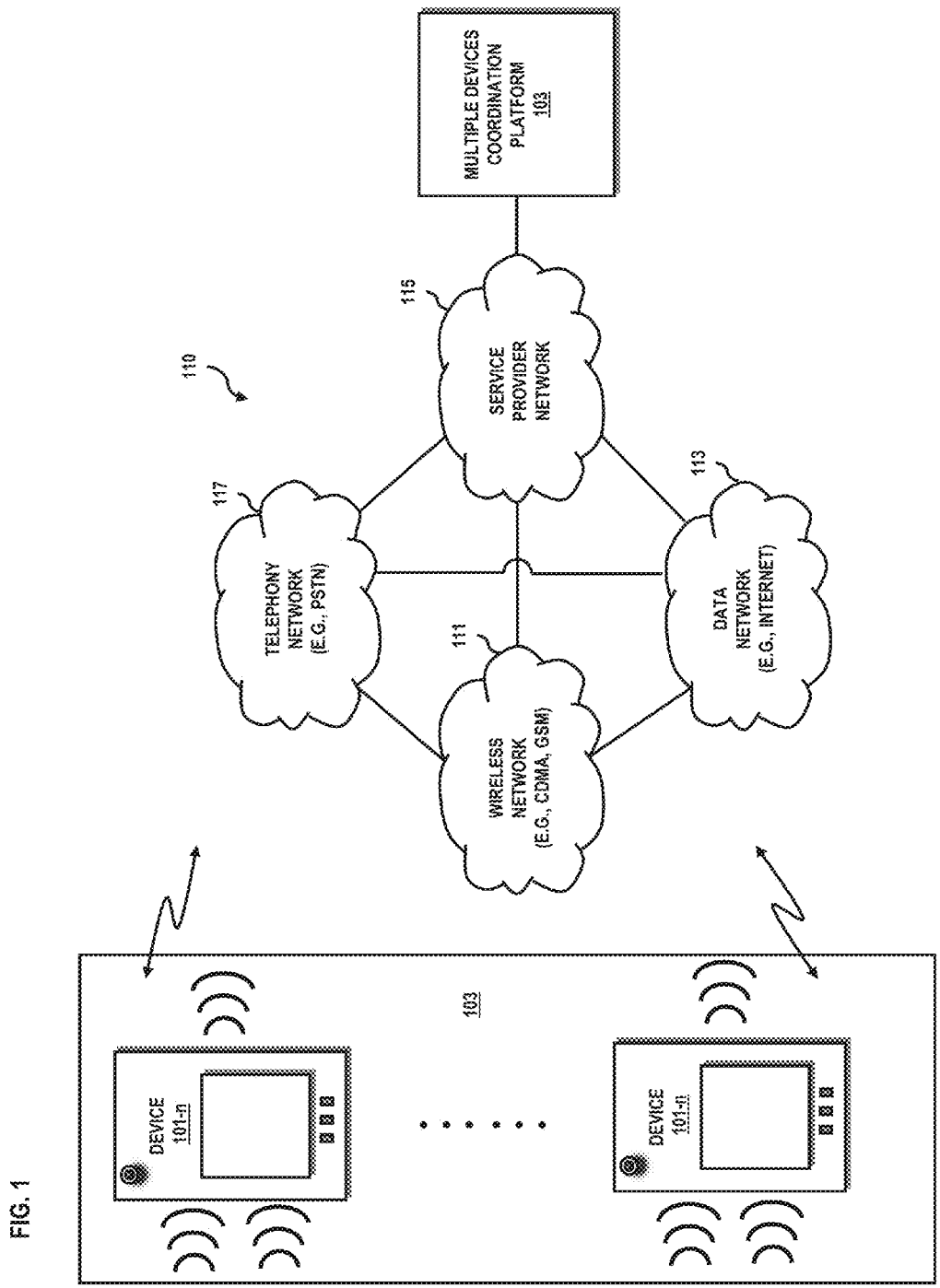
FIG. 1 is a diagram of a multiple device coordination platform for coordinating a plurality of devices to estimate or calculate various distances, relative positions, device attitudes, and other absolute and/or relative kinematic data, according to an embodiment of this invention.

Embodiments will now be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

A method and apparatus for configuring of a multiple device coordination platform for coordinating multiple devices to estimate or calculate various distances, relative positions, device attitudes, and other absolute and/or relative kinematic data is described. In the following description, for the purposes of explanation, numerous specific details are set forth in order to provide a thorough understanding of the embodiments of the invention. It is apparent, however, that the embodiments may be practiced without these specific details or with an equivalent arrangement. In other instances, well-known structures and devices are shown in block diagram form in order to avoid unnecessarily obscuring the embodiments.

Although various embodiments are described with respect to a terminal device, it is contemplated that these embodiments have applicability to any device capable of communicating over a network.

FIG. 1 is a diagram of a multiple device coordination platform for coordinating a plurality of devices, according to an embodiment. The multiple device coordination platform 103 system is capable of estimating or calculating various distances, relative positions, device attitudes, and other absolute and/or relative kinematic data of a plurality of devices according to an embodiment. In some embodiments, data are transmitted by requesting devices 101a-101n, which have a means of transmitting data between devices, to the multiple device coordination platform 103. In some embodiments, data are sensed by the devices 101a-101n by employing a sensor means to gather data associated with a surrounding environment in which the devices exist, and the raw sensory data gathered by the devices 101a-101n are transmitted to the multiple device coordination platform 103.

The devices 101a-101n may be mobile phones, Personal Digital Assistants (PDAs), Smartphones, tablets, laptops, desktops, televisions (possibly connected via set-top boxes, game systems, DVD players, etc.) and the like. The means of sensing the data may include a proximity sensor, a camera, a microphone, and the like. In one example, the sensor is a proximity sensor capable of detecting nearby objects. The proximity sensor may be, for example, an electromagnetic radiation sensor, a capacitive photoelectric sensor, an inductive sensor, or the like. In another example, the sensor is a camera capable of receiving visible or non-visible light. In yet another example, the sensor is a microphone capable of receiving audio signal in the form of acoustical waves. The means of transmitting the data is typically via a Wifi 111, cellular 117, or Ethernet network 113, but could include other means of transmission.

The approach of system 110, according to certain embodiments, enables any device 101a-101n (e.g., a mobile phone, a laptop, etc.) to be configured to estimate or calculate various distances, relative positions, and device attitudes. By way of this approach, a device 101 may contain or connect to transmission components associated with the device for transmitting and receiving a variety of nonintrusive signals (i.e., nonintrusive to participants using the device). In one example, a device 101 may contain or connect to speakers and microphones associated with the device for transmitting and receiving audio signals. In another example, the device 101 may contain or connect to radio frequency (RF) transmitters and receivers associated with the device for transmitting and receiving RF signals. In yet another example, the device 101 may contain or connect to infrared (IR) transmitters and receivers associated with the device for transmitting and receiving IR signals.

Further, a participant using the device 101 may estimate or calculate various distances, relative positions, and device attitudes and other absolute and/or relative kinematic data based on the signal (e.g., audio, optical, etc.) received from other devices. In some instances, the device 101 may be actively broadcasting a signal to other devices and receiving in response a return signal in order to estimate or calculate various distances, relative positions, and device attitudes and other absolute and/or relative kinematic data. In other instances, a device 101 may be passively sensing the environment in which it exists to receive the signal to assist in the estimation or calculation of various distances, relative positions, and device attitudes and other absolute and/or relative kinematic data. In particular, a plurality of devices, acting together, transmit cumulative raw sensory data about what they are sensing to the multiple device coordination platform 103. For example, a device 101a may transmit an image of an environment sensed through a built-in camera of the device 101a. Using this image along may be insufficient. However, the image, combined with other sensory data received from the devices 101b-101n, such as audio data received from microphones, enables the multiple device coordination platform 103 to estimate or calculate accurately the various distances, relative positions, device attitudes, orientation, and/or other relative kinematic data (velocities, angular, accelerations) about the devices 101a-101n.

In some embodiments, various types of processing may be applied to the raw sensory data gathered by the devices 101a-101n. In one example, image recognition algorithms may be applied to raw still images or video. In another example, noise filter algorithms may be applied to raw audio data. In some embodiments, the processing of the raw sensory data may be performed. In other embodiments, the processing of the raw sensory data may be performed by the multiple device coordination platform 103. A person having ordinary skill in the art will recognize the optimal configuration based on available computing power, bandwidth constraints, storage capacity, or other considerations.

In some embodiments, the multiple device coordination platform 103 may utilize the calculated various distances, relative positions, device attitudes, orientation, and/or other relative kinematic data (velocities, angular, accelerations) about the devices 101a-101n for constructing a real-time spatial model of the devices 101a-101n used by participants at a particular venue. The real-time spatial model may be used, for example, to track the movement of the devices, to apply gesture recognition, to alter the content displayed on devices used by the participants (such as rendering special effects on the display of a device used by a participant), and the like.

In some embodiments, the data received by the devices via active broadcasting and via passive sensing, as discussed above, may be utilized in parallel by the multiple device coordination platform 103 to estimate or calculate the various distances, relative positions, device attitudes, and other absolute and/or relative kinematic data.

The multiple device coordination platform 103 may operate in connection with a device 101 by way of a communication network. The device 101 may include various computer hardware, including multiple device coordination platform 103. Alternatively, the multiple device coordination platform 103 may be external to the devices 101. The multiple device coordination platform 103, among other capabilities, can retrieve the data information gathered by the device 101 on behalf of the respective subscribing participant.

In certain embodiments, devices 101a-101n may include cellular phones, BLUETOOTH-enabled devices, Wifi-enabled devices, satellite phone, smart phone, wireless phone, or any other suitable mobile device, such as a personal digital assistant (PDA), pocket personal computer, tablet, customized hardware, etc. which have the ability to transmit data between devices. In addition, devices 101a-101n may include a computer (e.g., desktop computer, laptop, web appliance, etc., which also have the ability to transmit data between devices).

In system 110, according to certain embodiments, one or more networks, such as data network 113, service provider network 115, telephony network 117, and/or wireless network 111, are provided to handle various communication sessions, voice communications as well as non-voice communications. Networks 111-117 may be any suitable wired and/or wireless network. For example, telephony network 117 may include a circuit-switched network, such as the public switched telephone network (PSTN), an integrated services digital network (ISDN), a private branch exchange (PBX), or other like network.

Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wifi), long term evolution (LTE), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Figure 2:
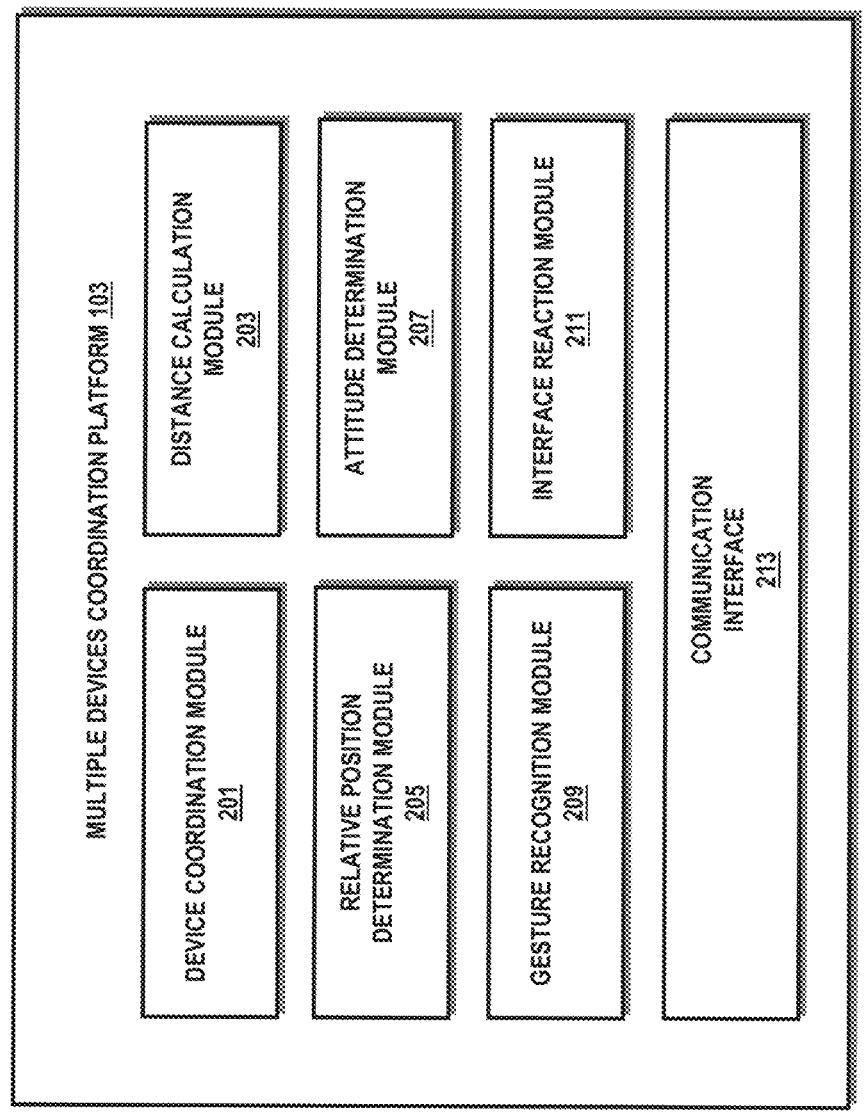
FIG. 2 is, respectively, a multiple device coordination platform, according to various embodiments of this invention.

FIG. 2 is, respectively, a diagram of a multiple device coordination platform 103, according to an exemplary embodiment. The a multiple device coordination platform 103 includes various executable modules for performing one or more computing, data processing and network based instructions that in combination enable devices 101a-101n to estimate or calculate various distances, relative positions, device attitudes, and other absolute and/or relative kinematic data. Also, it is noted that the modules encompassing the multiple device coordination platform 103 can be implemented in hardware, firmware, software, or a combination thereof In FIG. 2, a device, which may be a mobile device (e.g., mobile device 101a of FIG. 1), or a computer, includes a device coordination module 201 that is configured to estimate or calculate various distances, relative positions, device attitudes, and other absolute and/or relative kinematic data of devices. The device may also include distance calculation module 203 configured to measure or estimate the absolute/relative distance between devices. It is noted that these communication sessions can be established over a circuit-switched network, a packet-switch network, or a combination thereof. Thus, a communication interface 213 can be appropriately configured depending on the transport systems and networks. Furthermore, the communication interface 213 may provide a means of collaborative data exchange and communication between the device and the multiple device coordination platform 103 (FIG. 1).

In one embodiment, the device may also feature the relative position determination module 205 for estimating or calculating relative positions of devices; the attitude determination module 207 for estimating, recording and tracking the change in attitudes of one or more moving devices; gesture recognition module 209 for recognizing gestures performed with a handheld device; and interface reaction module 211 for changing the user interface of the device based on the proximity of the other device.

FIGS. 3A, 4A, 5, 6A, 7 and 8 are flowcharts of a system, method, and computer program product according to an embodiment. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions, which embody the procedures described above, may be stored by a memory device of a mobile terminal, server, or other computing device and executed by a built-in processor in the computing device. As will be appreciated, any such computer program instructions may be loaded onto a computer or other programmable apparatus (i.e., hardware) to produce a machine, such that the instructions which executed on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means, which implement the function specified in the flowchart block(s) or step(s). The computer program instructions may also be loaded onto a computer or other programmable apparatus to trigger a series of operational steps to be performed on the computer or other programmable apparatus to produce a computer-implemented process such that the instructions which executed on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

Distance

Figure 3A:
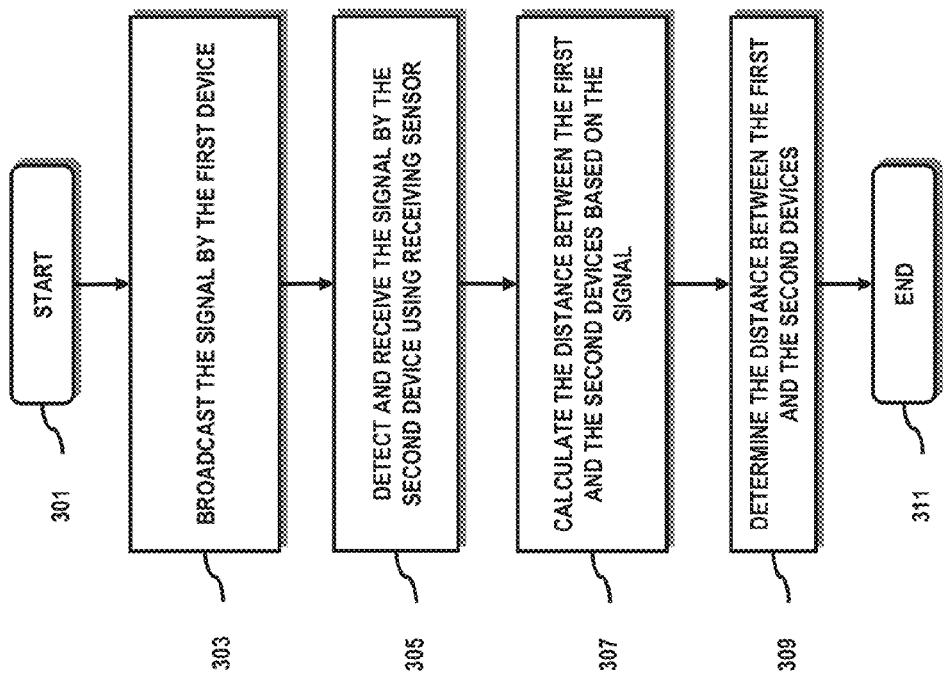
FIG. 3A is a flowchart of a process for configuring a multiple device coordination platform, for estimating the distance and other absolute and/or relative kinematic data between two devices, according to an embodiment of this invention.
Figure 3B:
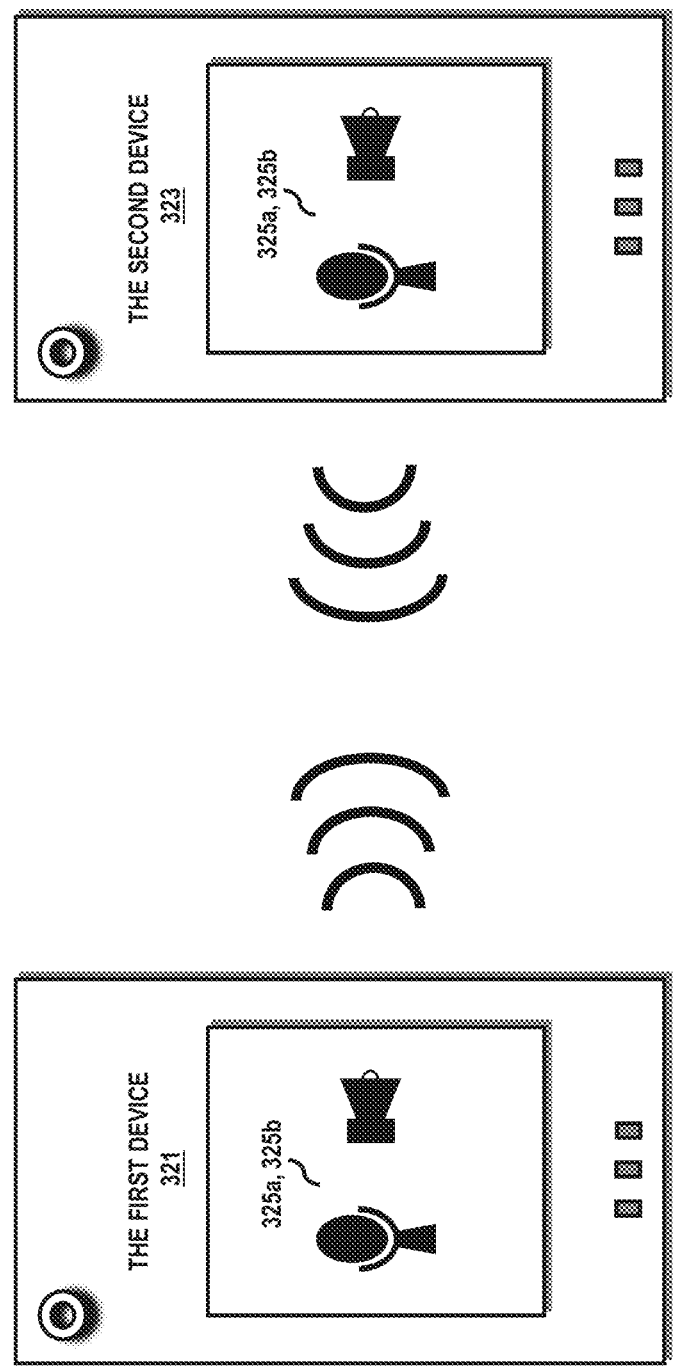
FIG. 3B is a diagram of two devices according to one embodiment of this invention.

In this regard, FIG. 3A, in steps 303, 305, 307, 309 and 311 of the process 301, is a flowchart of a process for configuring a multiple device coordination platform, for measuring the distance, and other absolute and/or relative kinematic data between two devices, for example, 321 and 323 (of FIG. 3B), according to an embodiment. For the purpose of illustration, the process is described with respect to FIGS. 3A-3B. Further, according to the embodiment, the process is described with respect to an audio signal. However, the process may be implemented with other signals (e.g., non-intrusive optical signals, etc.) in other embodiments. It is noted that the steps of the process may be performed in any suitable order, as well as combined or separated in any suitable manner. In steps 303 and 305 of process 301, one device (e.g., 321 or 323) broadcasts an audio signal using a speaker 325b to estimate or calculate the distance, and other absolute and/or relative kinematic data between two devices (e.g., 321 and 323). When two devices are close enough, this audio signal is picked up by the microphone 325a of the other device. Per steps 307 and 309, the absolute and/or relative distance, and other absolute and/or relative kinematic data between the two devices can be measured with reasonable accuracy based on the amplitude of the received signal. FIG. 3B is a diagram of two devices 321 and 323 according to one further teaching. The devices 321, 323 contain or are connected to components 325 capable of broadcasting and receiving the audio signal in the embodiment discussed above.

In another embodiment, the process 301 may be performed without step 303. The process 301, according to this embodiment, starts with a device, for example, 327 (of FIG. 3C), sensing, or detecting a signal from another device, such as 329 (of FIG. 3C), as indicated in step 305. The signal may be passively present with respect to the device 329 without the device 329 broadcasting the signal to the device 327. One example of the signal is an image being sensed, or gathered, by a proximity sensor 331 of the device 327 sensing a nearby existence of the device 329. In the same way, a signal (e.g., sensed image) may be sensed by the device 329 of the device 327, as indicated by step 305. Per steps 307 and 309, the absolute and/or relative distance, and other absolute and/or relative kinematic data between the two devices 327 and 329 can be measured with reasonable accuracy based on the signal sensed by the device 327 (and/or 329). FIG. 3C is a diagram of the two devices 327 and 329 according to one further teaching of the embodiment, where each device contains or is connected to a sensor 331 (e.g., a proximity sensor) capable of gathering raw sensory data.

Relative Position and Attitude

Figure 4A:
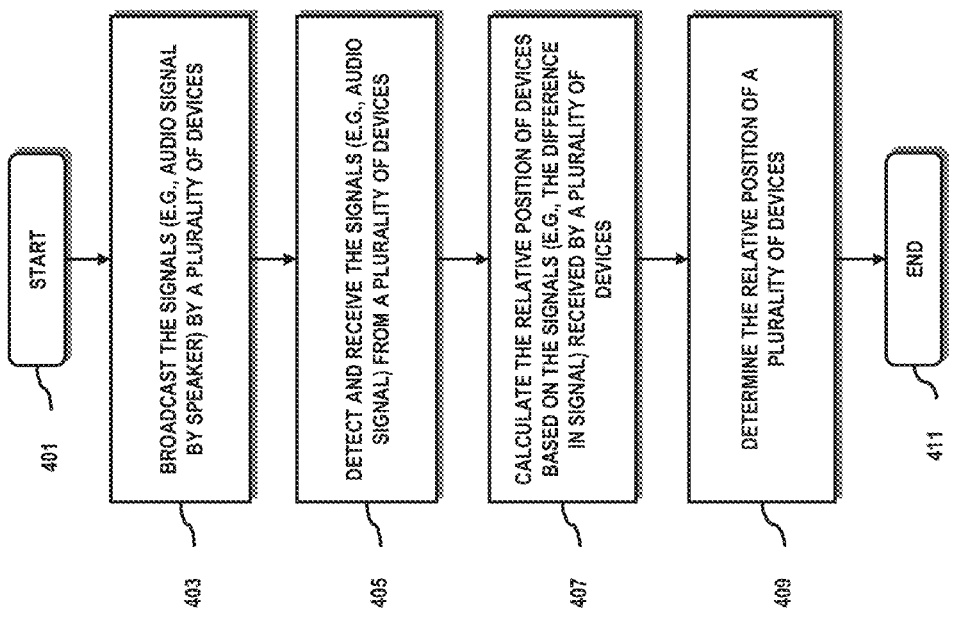
FIG. 4A is a flowchart of a process for configuring a multiple device coordination platform, for estimating relative positions and other absolute and/or relative kinematic data of devices, according to an embodiment of this invention.
Figure 4B:
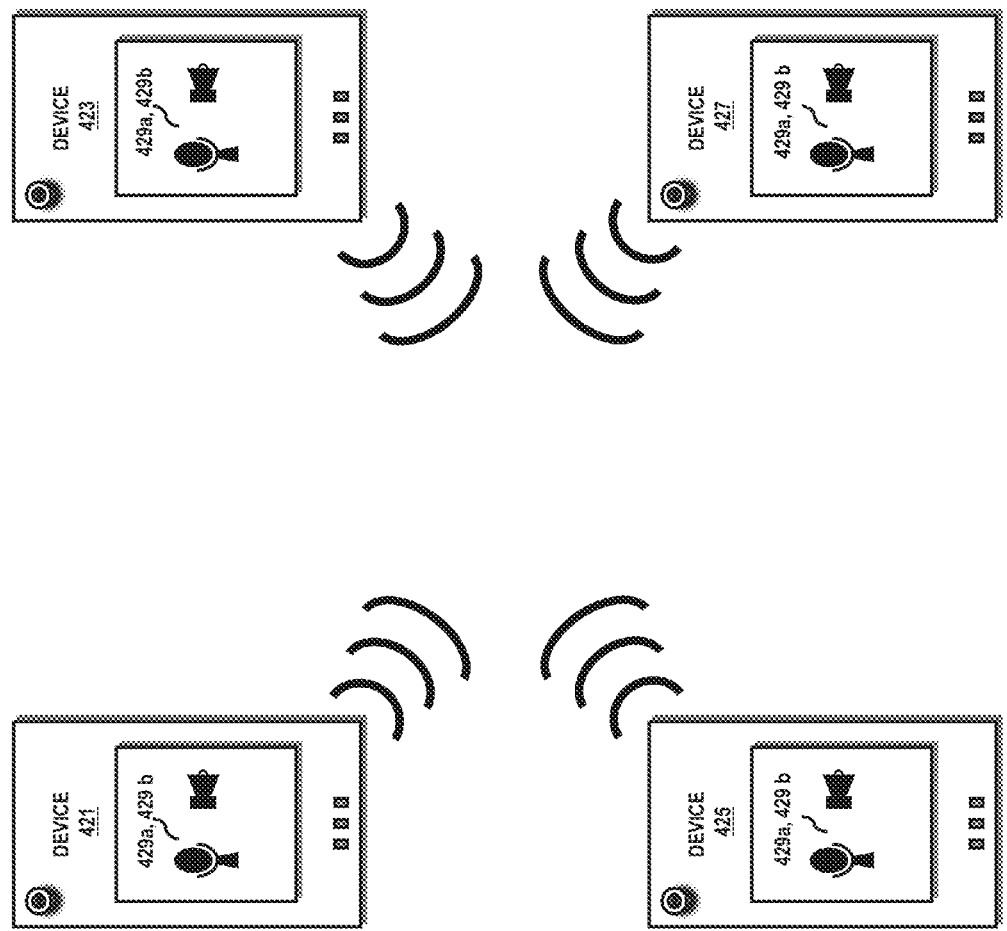
FIG. 4B is a diagram of multiple devices according to one embodiment of this invention.

FIG. 4A, in steps 403, 405, 407, 409 and 411 of process 401, is a flowchart of a process for configuring a multiple device coordination platform, for estimating or calculating relative positions, and other absolute and/or relative kinematic data of devices, for example, 421, 423, 425 and 427 (of FIG. 4B), according to an embodiment. For the purpose of illustration, the processes are described with respect to FIGS. 4A-4B. Again, it is noted that the steps of the process may be performed in any suitable order, as well as combined or separated in any suitable manner. Further, according to the embodiment, the process is described with respect to an audio signal. However, the process may be implemented in other embodiments with respect to other types of signals (e.g., non-intrusive optical signals, etc.). In certain embodiments, in situations where more than two devices are present in the local environment, relative positions of these devices can be estimate or calculated based on the difference in signal received by multiple devices. FIG. 4B is a diagram of multiple devices 421, 423, 425 and 427 according to one further teaching. In steps 403 and 405 of process 401, multiple devices (e.g., 421, 423, 425 and 427) broadcast audio signals using speakers 429b to estimate or calculate the relative positions, and other absolute and/or relative kinematic data between those devices (e.g., 421, 423, 425 and 427). When those devices are close enough, this audio signal will be picked up by the microphone 429a of other devices. Per steps 407 and 409, the relative positions, and other absolute and/or relative kinematic data between those devices can be measured with reasonable accuracy based on the amplitude of received signals.

Figure 4C:
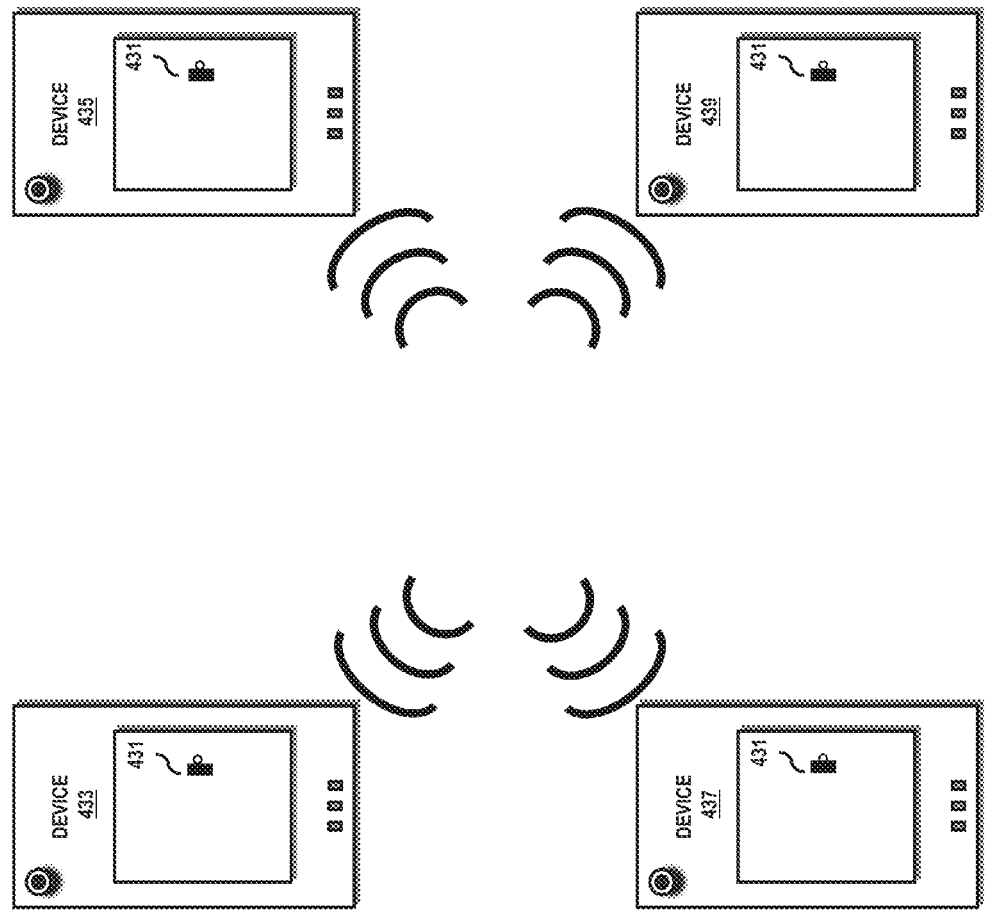
FIG. 4C is a diagram of two devices sensing a surrounding environment according to one embodiment of this invention.

In another embodiment, the process 401, according to this embodiment, starts with a device, for example, 433 (of FIG. 4C), sensing, or detecting, passively signals from other devices, such as 435, 437, and 439 (of FIG. 4C), as indicated in step 405. The signals may be passively present with respect to the devices 435-439 without being broadcast by those devices. One example of the signals are images sensed, or gathered, by a proximity sensor 431 of the device 435 sensing the nearby existence of the devices 435-439. In the same way as the device 433, each of the devices 435-439 senses signals of one another using the proximity sensor 431 to estimate or calculate the relative positions, and other absolute and/or relative kinematic data between the devices (e.g., 433, 435, 437 and 439). Per steps 407 and 409, the absolute and/or relative distance, and other absolute and/or relative kinematic data between the devices 435, 437, and 439 can be measured with reasonable accuracy based on the difference in signal received by the multiple devices. FIG. 4C is a diagram of the devices 433, 435, 437, and 439 containing or connecting to a sensor 431 (e.g., a proximity sensor) capable of gathering raw sensory data according to one further teaching of the embodiment.

Figure 5:
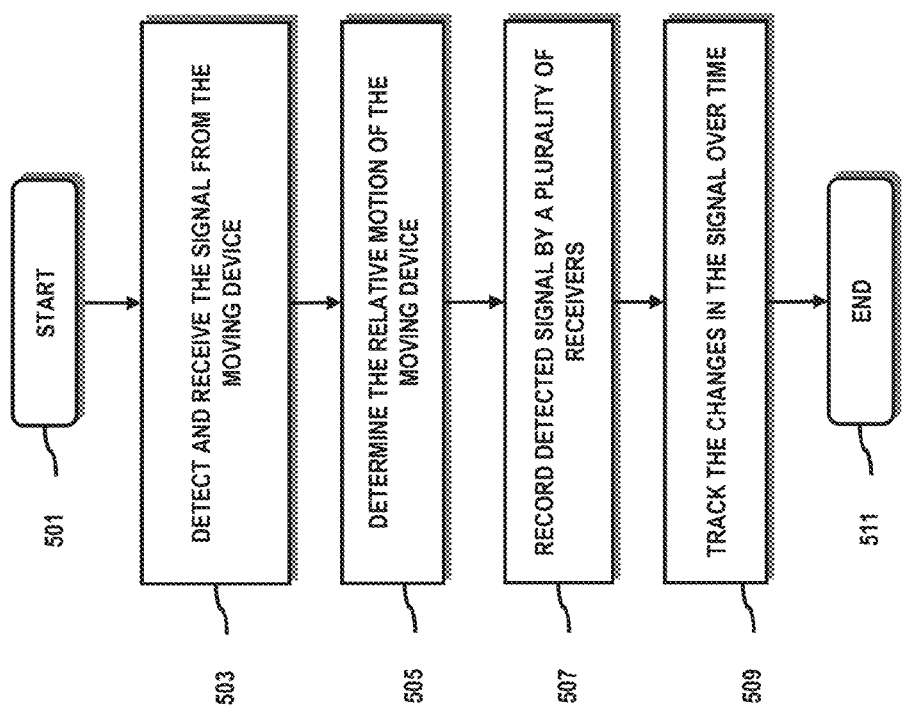
FIG. 5 is a flowchart of a process for configuring a multiple device coordination platform, for estimating, recording and tracking the relative motions and other absolute and/or relative kinematic data of one or more moving devices, according to an embodiment of this invention.
Figure 6A:
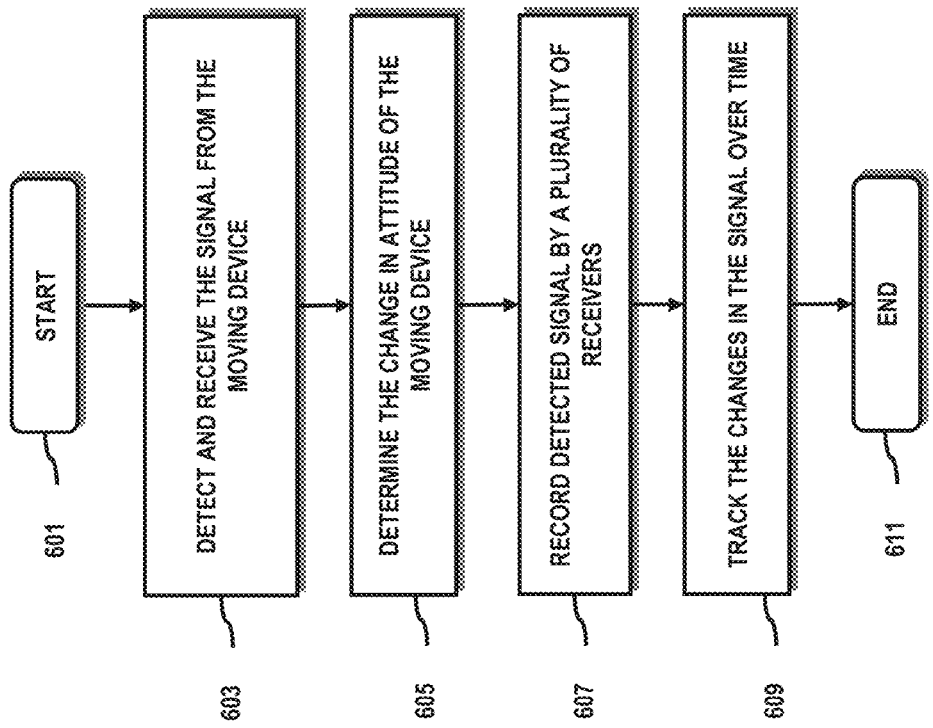
FIG. 6A is a flowchart of a process for configuring a multiple device coordination platform, for estimating, recording and tracking the change in attitudes and other absolute and/or relative kinematic data of one or more moving devices, according to an embodiment of this invention.

FIG. 5, in steps 503, 505, 507, 509 and 511 of process 501, is a flowchart of a process for configuring a multiple device coordination platform, for estimating, recording and tracking the relative motion, and other absolute and/or relative kinematic data of the moving device, according to an embodiment. FIG. 6A, in steps 603, 605, 607, 609 and 611 of process 601, is a flowchart of a process for configuring a multiple device coordination platform, for estimating, recording and tracking the change in attitude, and other absolute and/or relative kinematic data of the moving device, according to an embodiment. FIG. 6B illustrates the orientation 621 and the attitude of the device according to one further teaching. It should be noted that "attitude" in this context refers to the rotation of the device around its three dimensional axes.

For the purpose of illustration, the processes are described with respect to FIGS. 5 and 6A-6B. According to the embodiment, the processes are described with respect to an audio signal. However, the processes may be implemented in other embodiments with respect to other types of signals (e.g., non-intrusive optical signals, etc.). Again, it is noted that the steps of each process (FIG. 5 and FIG. 6A respectively) may be performed in any suitable order, as well as combined or separated in any suitable manner. In certain embodiments, in the case of a moving device, such as a handheld smart phone, the relative motion, change in attitude, and other absolute and/or relative kinematic data of the moving device can be recorded using the same general technique of comparing the audio signals detected by multiple receivers and tracking the changes in those signals over time. In step 503 of process 501, and step 603 of process 601, the moving device broadcasts the audio signal using speakers and when the moving device and other devices are close enough, this audio signal will be picked up by the microphone of other devices to estimate or calculate the relative motion, and the change in attitude of the moving device. Per steps 505-509 and 605-609, the relative motion, the change in attitude, and other absolute and/or relative kinematic data of the moving device can be measured with reasonable accuracy based on the amplitude of the received signal. In steps 507-509 and 607-609, those signals, and other absolute and/or relative kinematic data can be recorded and tracked over time.

Gesture Recognition

Figure 7:
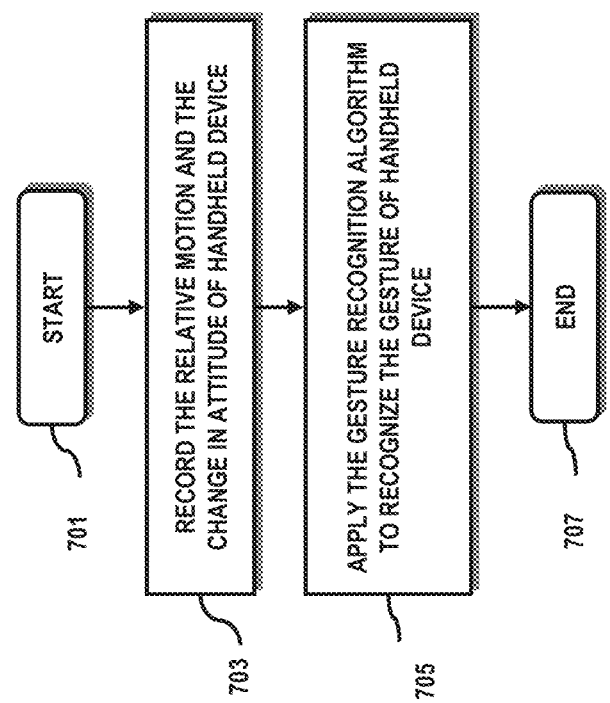
FIG. 7 is a flowchart of a process for configuring a multiple device coordination platform, for recognizing gestures and other absolute and/or relative kinematic data performed with handheld devices, according to an embodiment of this invention.

FIG. 7, in steps 703, 705 and 707 of process 701, is a flowchart of a process for configuring a multiple device coordination platform, for recognizing gestures, and other absolute and/or relative kinematic data performed with a handheld device, according to an embodiment. For the purpose of illustration, the processes are described with respect to FIG. 7, and it is noted that the steps of the process may be performed in any suitable order, as well as combined or separated in any suitable manner. In step 703, relative motions, change in attitudes and other absolute and/or relative kinematic data of handheld devices are recorded and tracked by the coordination platform. The recording and tracking may be implemented with respect to audio signals, for example, being transmitted between the devices. In other embodiments, the recording and tracking may be implemented with respect to other types of signals, such as IR signals. In 705, because the relative motions, the change in attitudes and other absolute and/or relative kinematic data of handheld devices can be recorded and tracked, a gesture recognition algorithm can be applied to recognize gestures made with those handheld devices. Such gestures can include, for example, pointing, panning, flicking, etc.

User Interface Change Based on Proximity

Figure 8:
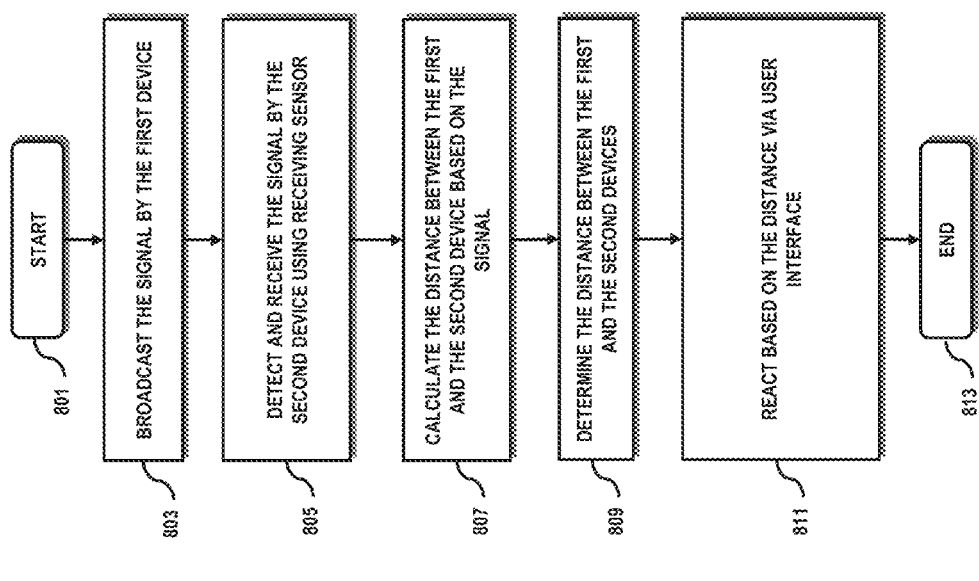
FIG. 8 is a flowchart of a process for configuring a multiple device coordination platform, for changing the user interface of the device based on the proximity and other absolute and/or relative kinematic data of the other device, according to an embodiment of this invention.

FIG. 8, in steps 803, 805, 807, 809, 811 and 813 of process 801, is a flowchart of a process for configuring a multiple device coordination platform, for changing the user interface of a device based on the proximity and other absolute and/or relative kinematic data of a second device, according to an embodiment. For the purpose of illustration, the processes are described with respect to FIG. 8, and it is noted that the steps of the process may be performed in any suitable order, as well as combined or separated in any suitable manner. In steps 803 and 805 of process 801, one device broadcasts an audio signal using a speaker to estimate or calculate the distance, and other absolute and/or relative kinematic data between two devices. When two devices are close enough, this audio signal is picked up by the microphone of the other device. Per steps 807 and 809, the absolute and/or relative distance, and other absolute and/or relative kinematic data between the two devices can be measured with reasonable accuracy based on the amplitude of the received signal.

Figure 9:
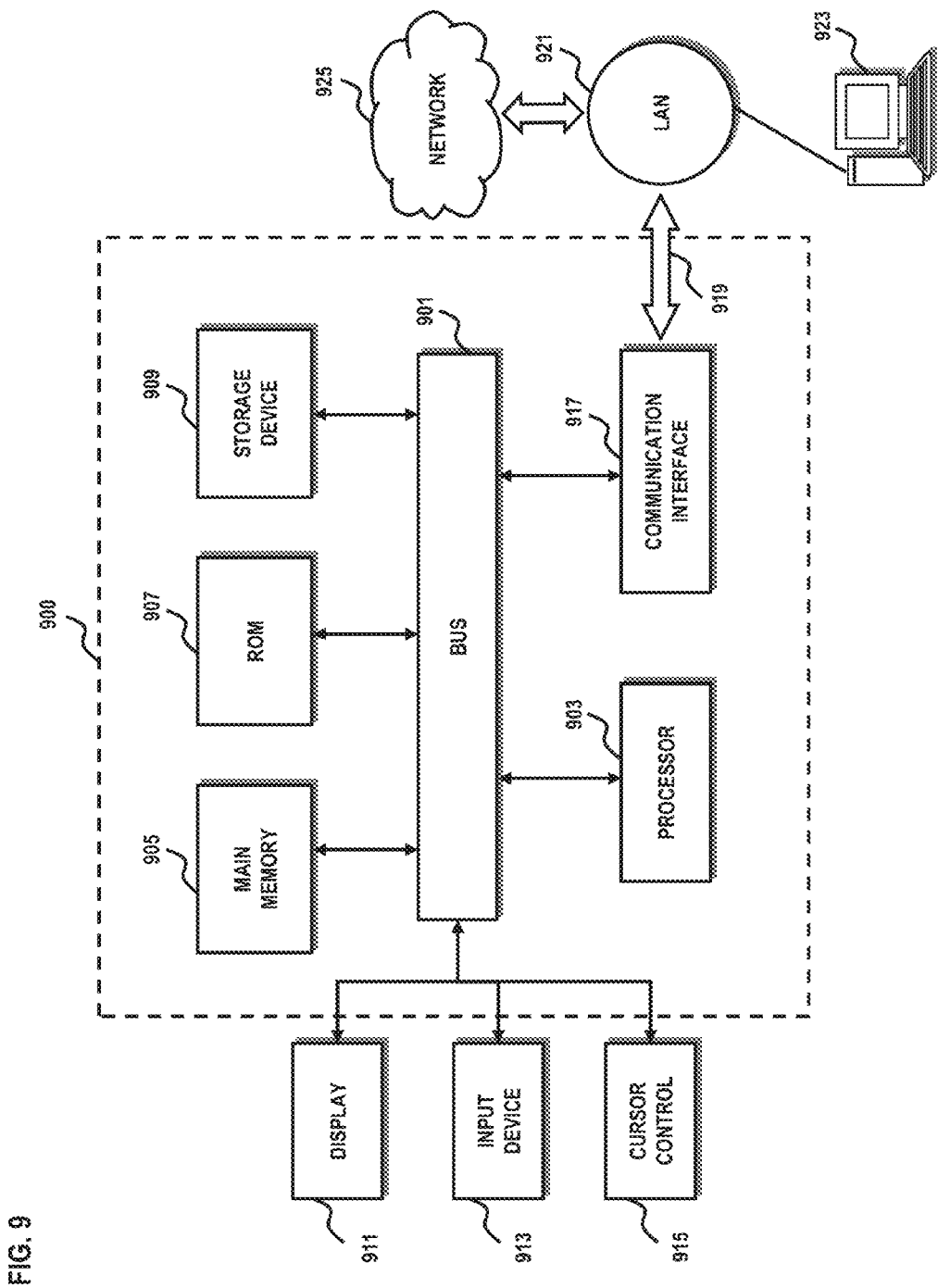
FIG. 9 is a diagram of a computer system that can be used to implement various embodiments.

In step 811, when two devices can measure each other's relative distance and other absolute and/or relative kinematic data, the user interfaces of the devices can react based on the distance and other absolute and/or relative kinematic data. For example, consider an app that allows the sharing of photos between two devices. As one device is moved closer to another, the shared photo from one device can become larger on the screen of the other device. FIG. 9 is a diagram of a computer system that can be used to implement various embodiments. The computer system 900 includes a bus 901 or other communication mechanism for communicating information and one or more processors (of which one is shown) 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a participant using a computer. An input device 913, such as a keyboard including alphanumeric and other keys, is coupled to the bus 901 for communicating information and command selections to the processor 903. Another type of input device is a cursor control 915, such as a mouse, a trackball, or cursor direction keys, for communicating direction information and command selections to the processor 903 and for adjusting cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
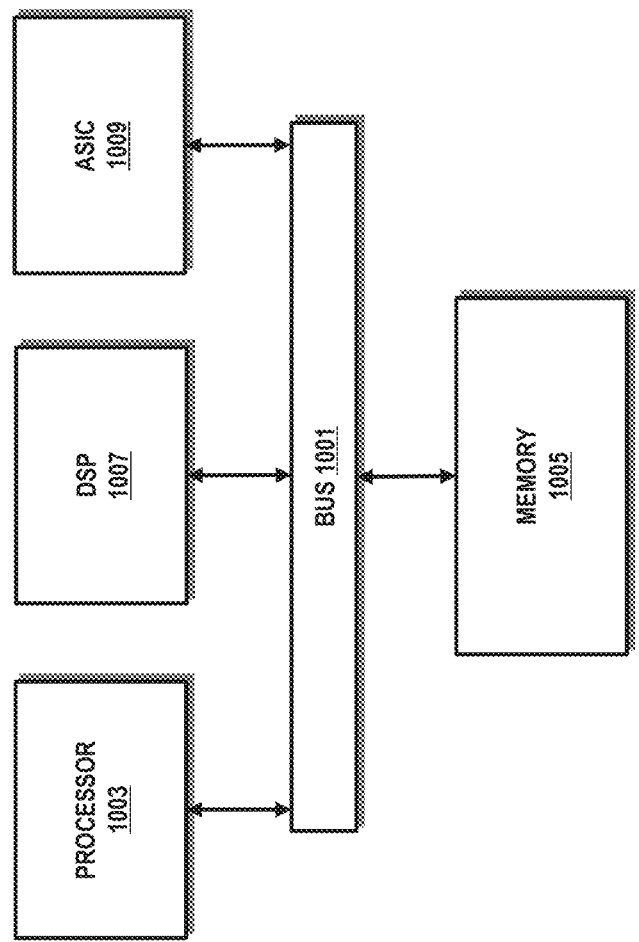
FIG. 10 is a diagram of a chip set that can be used to implement an embodiment.

FIG. 10 illustrates a chip set or chip 1000 upon which an embodiment of the invention may be implemented. Chip set 1000 is programmed to configure a multiple device coordination platform for coordinating multiple devices to estimate or calculate the distance, relative position, and device attitude as described herein and includes, for instance, the processor and memory components described with respect to FIG. 1-2 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of configuring an image correction platform to enable the angle correction system for modify the images.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to configure an image correction platform to enable the angle correction system for modify the images. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternatives or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the invention.

The invention claimed is:

1. A method of determining distances, relative positions, device attitudes, orientations, or kinematic data for each of a plurality of devices in an environment by processing information gathered by the plurality of devices located within the environment, the method comprising:
   transmitting, from a first device, a first transmission into the environment, wherein the first transmission contains a first transmission characteristic associated with the first device and location of the first transmission within the environment;
   receiving, at the first device, a second transmission from a second device located within the environment, wherein the second transmission includes a second transmission characteristic associated with the second device and the location of the second transmission within the environment;
   capturing, at the first device, an image of the environment using one or more sensors;

processing, by the first device, the first transmission characteristic and the second transmission characteristic to determine a first distance, relative position, device attitude, orientation, or kinematic data with respect to the location of the first transmission;

processing, by the first device, the first transmission characteristic and the second transmission characteristic to determine a second distance, relative position, device attitude, orientation, or kinematic data with respect to the location of the second transmission; and processing, by the first device, the first distance, relative position, device attitude, orientation, or kinematic data, the second distance, relative position, device attitude, orientation, or kinematic data, and the captured image to determine a third distance, relative position, device attitude, orientation, or kinematic data associated with at least some of the plurality of devices within the environment.

2. The method of claim 1, wherein the first transmission comprises an audio signal transmission.

3. The method of claim 2, wherein the first transmission characteristic comprises an amplitude of the audio signal transmission.

4. The method of claim 1, wherein the second transmission comprises an audio signal transmission.

5. The method of claim 4, wherein the second transmission characteristic comprises an amplitude of the audio signal transmission.

6. The method of claim 1, wherein processing the first distance, relative position, device attitude, orientation, or kinematic data and the second distance, relative position, device attitude, orientation, or kinematic data to determine the third distance, relative position, device attitude, orientation, or kinematic data further comprises processing other data gathered from the environment about the location of the first transmission and about the location of the second transmission.

7. A method of processing data from a plurality devices located proximate to each other within an environment to determine a distance, relative position, device attitude, orientation, or kinematic data for each of the plurality of devices within the environment, the method comprising:

receiving, at a third device, a first transmission from a first device, wherein the first transmission includes a first transmission characteristic associated with a location of the first transmission and data associated with the environment about the first transmission location;

receiving, at the third device, a second transmission from a second device, wherein the second transmission includes a second transmission characteristic associated with a location of the second transmission and data associated with the environment about the second transmission location;

capturing, by the third device, an image of the environment using one or more sensors;

processing, by the third device, the first transmission characteristic with respect to the location of the second transmission to generate a first relative distance between the first device and the second device; and processing, by the third device, the second transmission characteristic with respect to the location of the first transmission to generate a second relative distance between the first device and the second device; and analyzing, by the third device, the first relative distance, the second relative distance, and the image to determine a proximity of the first device to the second device within the environment.

8. The method of claim 7, wherein the first transmission comprises a signal.

9. The method of claim 7, further comprising coordinating, by the third device, the transmission of the first transmission and the second transmission.

10. The method of claim 7, wherein the data associated with the environment about the location of the first transmission comprises data received from a plurality of sensors configured to sense the environment.

11. The method of claim 10, wherein at least one of the plurality sensors comprises an audio signal sensor.

12. The method of claim 7, wherein the first transmission characteristic is associated with the second signal transmission.

13. The method of claim 7, comprising:

analyzing, by the third device, the first relative distance includes determining a relative attitude between the first device and the second device.

14. A non-transitory computer-readable storage medium storing code configured to direct one or more processors associated with one or more computer systems to process data from a plurality devices located proximate to each other within an environment to determine a distance, relative position, device attitude, orientation, or kinematic data for each of the plurality of devices within the environment, the computer-readable storage medium comprising:

code for receiving a first transmission from a first device, wherein the first transmission includes a first transmission characteristic associated with the location of the first transmission and data associated with the environment about the location of the first transmission;

code for receiving a second transmission from a second device, wherein the second transmission includes a second transmission characteristic associated with the location of the second transmission and data associated with the environment about the location of the second transmission;

code for capturing an image of the environment using one or more sensors;

code for processing the first transmission characteristic with respect to the location of the second transmission location to determine a first relative distance between the first device and the second device; and code for processing the second transmission characteristic with respect to the location of the first transmission to determine a second relative distance between the first device and the second device; and code for analyzing the first relative distance, the second relative distance, and the image to determine a proximity of the first device to the second device within the environment.

15. The non-transitory computer-readable storage medium of claim 14, wherein the first transmission comprises a signal.

16. The non-transitory computer-readable storage medium of claim 14, further comprising code for coordinating the transmission of the first transmission and the second transmission.

17. The non-transitory computer-readable storage medium of claim 14, wherein the data associated with the environment about the first transmission location comprises data received from a plurality of sensors configured to sense the environment.

18. The non-transitory computer-readable storage medium of claim 17, wherein at least one of the two sensors comprises an audio signal sensor.

19. The non-transitory computer-readable storage medium of claim 14, wherein the first transmission characteristic is associated with the second signal transmission.

20. The non-transitory computer-readable storage medium of claim 14, comprising:
   code for analyzing the first relative distance comprises code for determining a relative attitude between the first device and the second device.

21. The method of claim 7, comprising:
   modifying, by the third device, a user interface of at least one of the first device and the second device based upon the proximity of the first device to the second device in the environment.

\* \* \* \* \*